US008185731B2

(12) United States Patent
Axnix et al.

(10) Patent No.: US 8,185,731 B2
(45) Date of Patent: May 22, 2012

(54) DEVICE FOR CONFIGURING FUNCTIONAL CAPABILITIES IN A DATA PROCESSING SYSTEM

(75) Inventors: Christine Axnix, Steinenbronn (DE); Juergen Probst, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 12/211,588

(22) Filed: Sep. 16, 2008

(65) Prior Publication Data

US 2009/0083533 A1 Mar. 26, 2009

(30) Foreign Application Priority Data

Sep. 25, 2007 (EP) .................................... 07117149

(51) Int. Cl.
*G06F 1/24* (2006.01)
*G06F 15/177* (2006.01)
*G06F 21/00* (2006.01)
(52) U.S. Cl. .............................. 713/100; 713/1; 713/183
(58) Field of Classification Search .................. 713/100, 713/1, 183; 718/102; 1/1; 705/3
See application file for complete search history.

(56) References Cited

U.S. PATENT DOCUMENTS

| 5,365,587 | A | * | 11/1994 | Campbell et al. ............. 713/183 |
| 5,982,899 | A | * | 11/1999 | Probst ............................... 713/1 |
| 2003/0120914 | A1* | | 6/2003 | Axnix et al. .................. 713/100 |

FOREIGN PATENT DOCUMENTS

WO WO 2007006592 A2 * 1/2007

OTHER PUBLICATIONS

Probst et al., "Flexible configuration and concurrent upgrade for the IBM eServer z900", IBM Journal of Research and Development, vol. 46, No. 4/5, Jul./Sep. 2002, pp. 551-558.

* cited by examiner

*Primary Examiner* — Chun Chao
*Assistant Examiner* — Aurel Prifti
(74) *Attorney, Agent, or Firm* — Yee & Associates, P.C.; Cynthia G. Seal

(57) ABSTRACT

A method for configuring functional capabilities in a data processing system. An intermediate link record and a System Anchor record containing the unchangeable hardware ID are used. All entitlement records are then linked to the System Anchor record. Only the System Anchor record links to the unchangeable hardware ID. It contains a system unique ID. The entitlement records link to the System anchor record via the system unique ID. The repair (or upgrade) situation with the exchange of a hardware component now becomes much simpler. There is no exchange of any asset protection record (neither System Anchor record nor entitlement record) required as long as the hardware component comprising the asset protection record is not exchanged. In case the hardware component comprising the asset protection record needs to be exchanged, the System Anchor record only must be exchanged but all the entitlement records can stay unchanged.

18 Claims, 6 Drawing Sheets

DEVICE FOR CONFIGURING FUNCTIONAL CAPABILITIES IN A DATA PROCESSING SYSTEM

BACKGROUND OF THE INVENTION

The present invention relates to the configuration of functional capabilities in a data processing system.

On Demand processor and memory capacity needs more physical capacity installed than enabled on computer systems. As long as there is dormant physical capacity available such capacity can be activated as the customer need demands. In J. Probst et al "Flexible configuration and concurrent upgrade for the IBM eServer z900" and the patent U.S. Pat. No. 7,194,616 such scenario is described in more detail. The use of dormant physical capacity to compensate lost physical capacity of a computer system is shown WO 2007/006592 A2.

To prevent unauthorized activation of dormant capacity the activation is usually protected by a control system utilizing encryption as well as further secure methods binding the entitlement data to a specific machine. For example, patent U.S. Pat. No. 5,982,899 describes a method utilizing an unchangeable unique identifier that may be located within an integrated circuit chip.

A state of the art computer system may be comprised of multiple processor books each of them providing processor and memory resources. The amount of resources may be identical or differ between the multiple processor books. All those resources may be combined to a single SMP (Symmetrical Multi Processor) system such that it does not matter how the enabled capacity is allocated from the physical capacity provided by multiple processor books, i.e. the entitlement for permanent and for temporary capacity is specified and charged at the system level.

The example implementation of a hardware capacity 100 of a computer system shown in FIG. 1 utilizes the unchangeable identifiers (ECID: Engineering Change IDentifier) 110, 120, 130, 140 of each single processor book 150, 160, 170, 180 to bind the entitlements for the physical resources of the corresponding processor books to their hardware implementation and prevent usage of the entitlement data contained in the associated entitlement records 115, 125, 135, 145 for other processor books residing in the same computer system or in a different computer system. Therefore, there is a one to one relationship between a particular processor book and the associated entitlement record.

There is one major disadvantage with this approach: Sometimes processor books need to be exchanged for repair or upgrade purposes. When a processor book is being exchanged carrying the ECID for the encrypted entitlement record this record also must be exchanged to match the ECID of the replacing book and a new entitlement record with the appropriate processor and memory definitions must be created and loaded into the machine. Since the data is machine configuration specific it cannot be stored as a generic record but must be created for example on-line utilizing the current authorization definition of the failing processor book. This needs on-line access to the critical asset protection system. Also the certificate of tokens concept described in IPCOM000139433D does not solve this problem.

SUMMARY OF THE INVENTION

It is therefore an object of the present invention to provide a method and a device for configuring functional capabilities in a data processing system that is improved over the prior art, and a corresponding computer program and computer program product, and a corresponding data processing system.

This object is achieved by the invention as defined in the independent claims. Further advantageous embodiments of the present invention are defined in the dependent claims.

The advantages of the present invention are achieved by separating the ECID from the entitlement records by using an intermediate link record, a System Anchor record containing the ECID of a specific processor book. All the entitlement records are then linked to the System Anchor record. Only the System Anchor record links to the unchangeable hardware ID (identifier). It contains a system unique ID (e.g. the system serial number S/N) and the entitlement records link to the System anchor record via the system ID.

One preferred embodiment of the invention is a method for configuring functional capabilities in a data processing system comprising an exchangeable component, said component comprising a first unique identifier in a first non-volatile storage, said first unique identifier being unchangeable, said data processing system further comprising entitlement records in said first non-volatile storage and/or a second non-volatile storage, the method comprising the steps of:

reading a second unique identifier and a system unique identifier in encrypted form from one of the following: said first non-volatile storage, said second non-volatile storage, a third non-volatile storage;

decrypting said second unique identifier and said system unique identifier;

comparing said first unique identifier and said second unique identifier, and, in case of a match, for every entitlement record:

extracting a record identifier and record entitlement data, comparing said record identifier with said system unique identifier, and, in case of a match, entitling resources of said component with said record entitlement data;

configuring functional capabilities based on the resource entitlements.

Preferably, said component comprises said third non-volatile storage, and said third non-volatile storage is used in the reading step.

Another preferred embodiment of the invention is a device for configuring functional capabilities in a data processing system, said data processing system comprising an exchangeable component, said component comprising a first unique identifier in a first non-volatile storage, said first unique identifier being unchangeable, said data processing system further comprising entitlement records in said first non-volatile storage and/or a second non-volatile storage, the device comprising:

reading means to read a second unique identifier and a system unique identifier in encrypted form from one of the following: said first non-volatile storage, said second non-volatile storage, a third non-volatile storage;

decrypting means to decrypt said second unique identifier and said system unique identifier, wherein said decrypting means are responsive to said reading means;

first comparing means to compare said first unique identifier and said second unique identifier;

extracting means to extract from every entitlement record a record identifier and record entitlement data, wherein said extracting means are responsive to said first comparing means;

second comparing means to compare said record identifier with said system unique identifier;

entitling means to entitle resources of said component with said record entitlement data, wherein said entitling means are responsive to said second comparing means;

configuring means to configure functional capabilities based on the resource entitlements.

The repair (or upgrade) situation with the exchange of a hardware component such as a processor book now becomes much simpler:

There is no exchange of any asset protection record (neither System Anchor record nor entitlement record) required as long as the hardware component comprising the asset protection record is not exchanged.

In case the hardware component comprising the asset protection record needs to be exchanged the System Anchor record only must be exchanged but all the entitlement records can stay unchanged.

BRIEF DESCRIPTION OF THE DRAWINGS

The present invention and its advantages are now described in conjunction with the accompanying drawings.

DETAILED DESCRIPTION OF THE INVENTION

Overview

Figure 1:
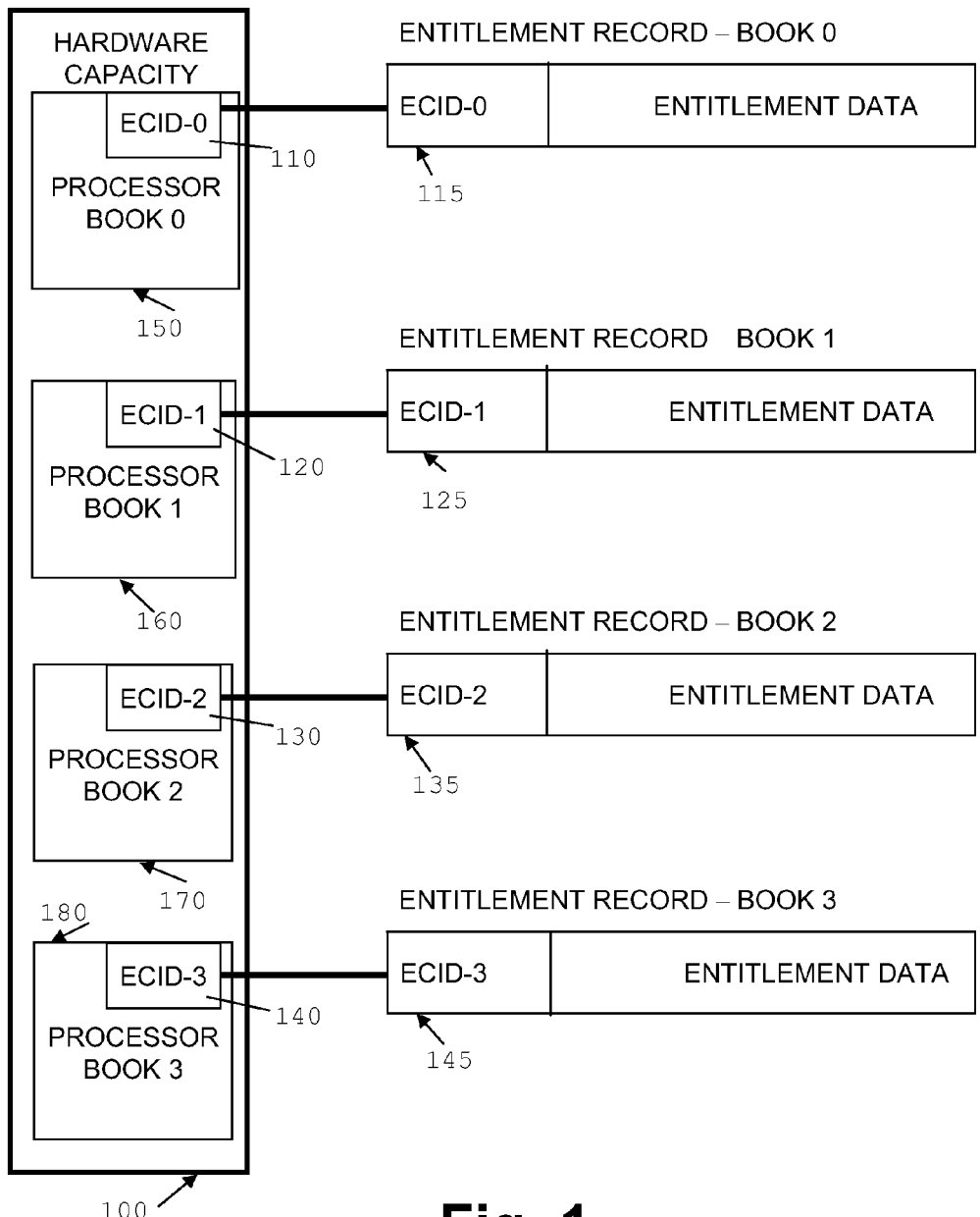
FIG. 1: Is a block diagram of a subsystem of a computer system.
Figure 2:
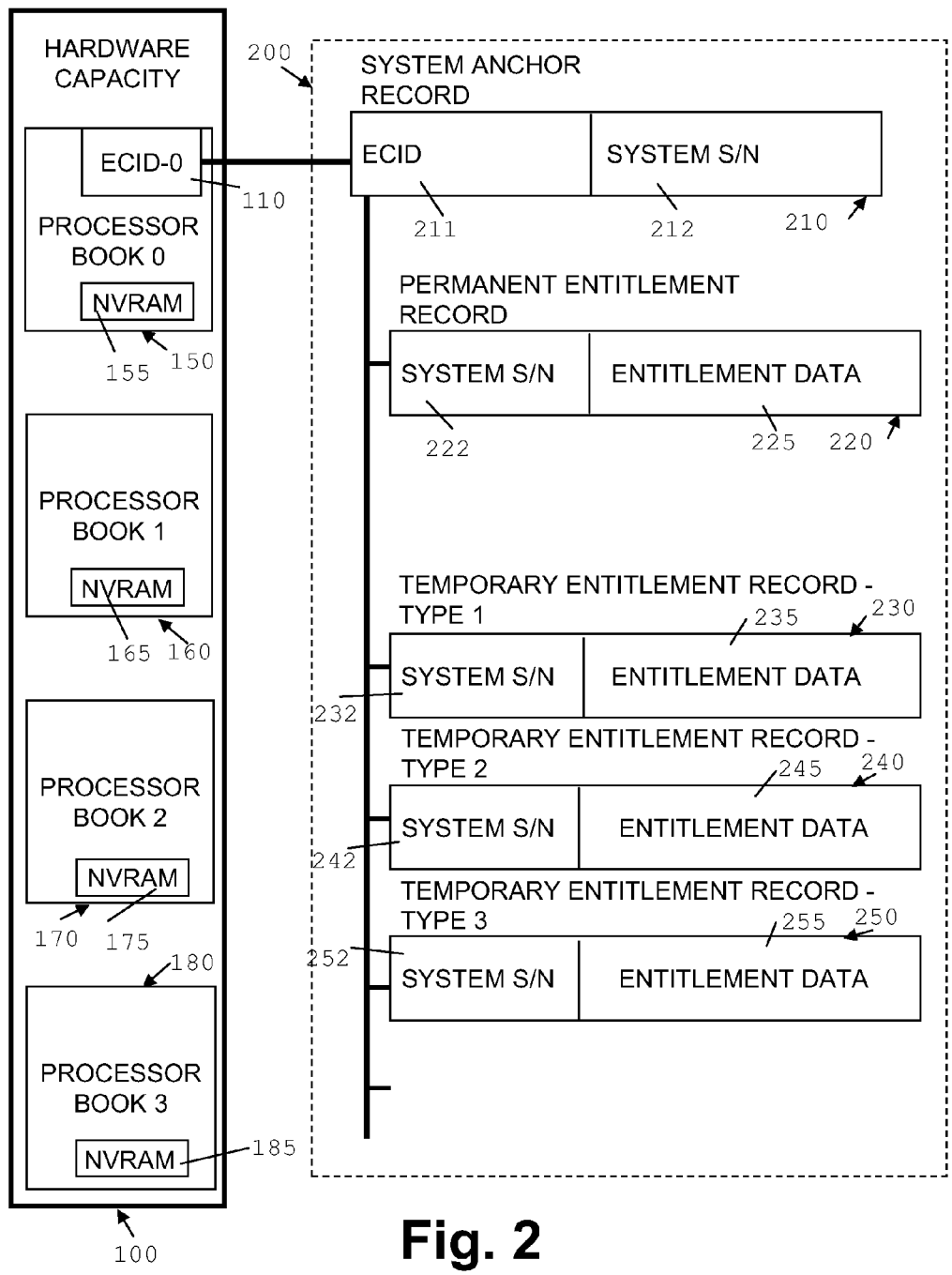
FIG. 2: Is a block diagram of a subsystem of a computer system in accordance with the present invention.

FIG. 2 shows the hardware capacity 100 of FIG. 1. The processor books 150, 160, 170, 180 contain non-volatile memory 155, 165, 175, 185 respectively, e.g. implemented by NVRAM (Non-volatile Random Access Memory) or flash memory. The content 200 of the non-volatile memory 155 of processor book 150 comprises a System Anchor record 210 and permanent and temporary entitlement records, e.g. the permanent entitlement record 220 and the temporary entitlement records 230, 240, 250 as shown. The System Anchor record 210 contains an ECID 211 and a system unique ID 212. An example for a system unique ID 212 could be the system serial number (S/N), which is assigned by the manufacturer of the computer system. The ECID 211 is unique and as being part of a chip it is unchangeable and cannot be cloned as long as the chip cannot be cloned by third party. The System Anchor record 210 links to the ECID 110 of the processor book 150 and is encrypted, e.g. via the asymmetric RSA (Rivest Shamir Adleman) cryptosystem. The System Anchor record 210 may be generated as suggested by U.S. Pat. No. 5,982,899. In that case, the System Anchor record 210 cannot be changed and it cannot be generated with a different system unique ID since the RSA private key is unknown to unauthorized people.

Entitlement records 220, 230, 240, 250 are linked to the System Anchor record 210 using the system unique ID 212 as linkage. Any number and type of entitlement records can be linked to the System Anchor record 210. The entitlement records 220, 230, 240, 250 are also encrypted and thus cannot be changed or generated without authorization. The entitlement records 220, 230, 240, 250 contain a unique identifier and specify resources at the system level and thus the total of resources is easy to calculate. The unique identifiers 222, 232, 242, 252 must be equal to the system unique identifier 212. The resources are specified by the entitlement records 220, 230, 240, 250 by their entitlement data 225, 235, 245, 255 respectively.

Generation of a System Anchor Record

Figure 3:
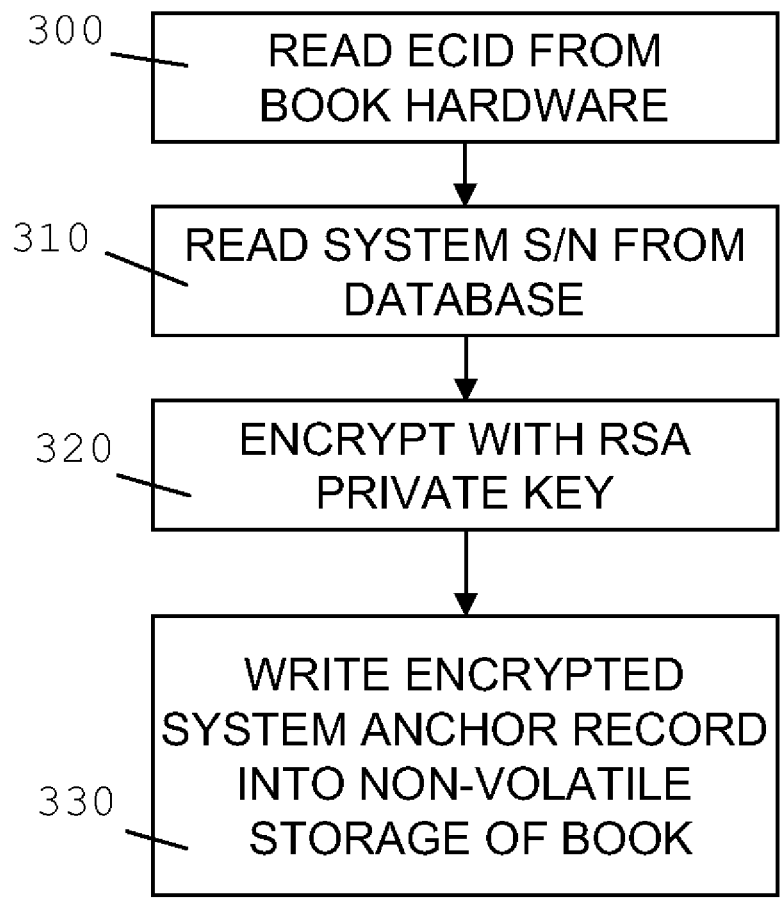
FIG. 3: Is a flow diagram illustrating a method in accordance with the invention.

The System Anchor Record 210 is built during manufacturing of the computer system. FIG. 3 illustrates this process. In step 300 an unchangeable identifier of some proprietary chip contained in a book of the computer system is read from the respective book hardware and used as the ECID 211. In step 310 the serial number of the computer system is retrieved from some manufacturing database and used as the system unique ID 212. The system serial number may or may not be encoded with the ECID 211 as suggested by U.S. Pat. No. 5,982,899. The resulting data reflecting the ECID 211 and the system unique ID 212 is encrypted with the private key utilizing RSA or another asymmetrical encryption algorithm in step 320. The encrypted data builds the System Anchor record 210, which is written in step 330 into a non-volatile storage of a book of the computer system.

The format of the System Anchor record 210 may be specific or a common record format may be used for the System Anchor Record 210 and for the Entitlement Records 220, 230, 240, 250 consisting of all elements needed for both types of records and utilizing only those elements needed for the respective record type. The entitlement records 220, 230, 240, 250 contain entitlements for exploitation of hardware capability and hardware capacity in the entitlement data 225, 235, 245, 255, e.g. the number and type of processors and the amount of memory available to the customer. The hardware capacity shipped may exceed the capacity purchased by the customer. For example, an entitlement record may be permanent as entitlement record 220, which means that its entitlements are permanent, or it may be temporary only as the entitlement records 230, 240, 250, which means that its entitlements are valid temporarily only.

Generation and Distribution of Entitlement Records

Figure 4:
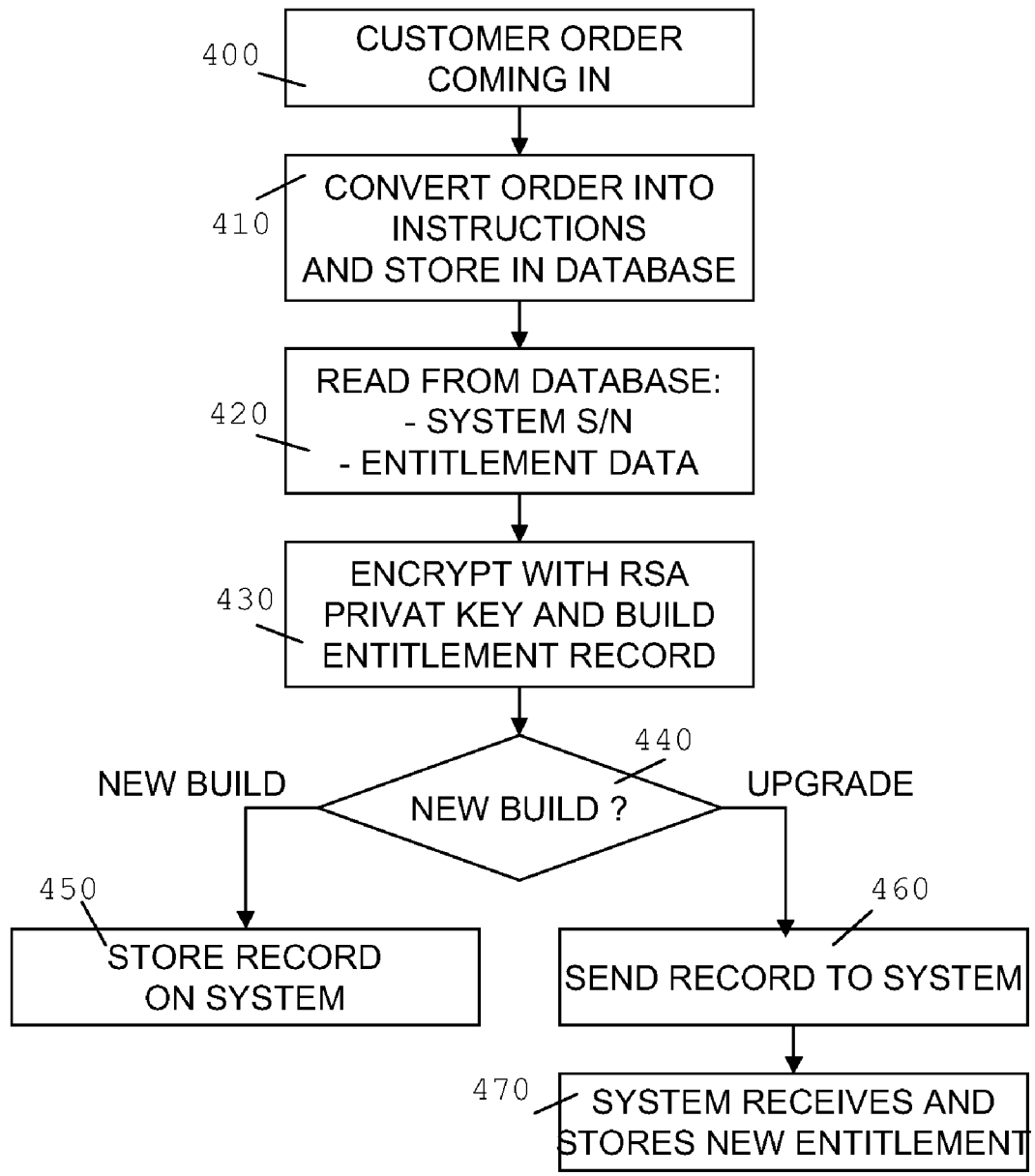
FIG. 4: Is a flow diagram illustrating a method in accordance with the invention.

FIG. 4 illustrates the generation and distribution of entitlement records. When the customer order for a computer system arrives at the manufacturer (step 400), then in step 410 the order data is converted into production and shipment instructions (e.g. processor capacity into required hardware capacity to be shipped and processor capacity to be enabled to exactly fulfill the order). The converted order data is then stored in a database. In case of an upgrade-order the computer system is already reflected in that database together with the system serial number. For a new order a system serial number may have to be assigned. From this database the system serial number and the entitlement data are retrieved in step 420 and then encrypted with the private key utilizing an asymmetric encryption algorithm like RSA in step 430. The resulting record from this process is called the Encrypted Entitlement Record. For new builds (step 440) the encrypted entitlement record is stored in some non-volatile storage of the new computer system in step 450. For upgrade orders the record is transferred in step 460 to the target computer system at the customer site where in step 470 the target computer system receives the data and stores it in some non-volatile storage. For example, the transfer can be performed via the Internet.

Processing of Entitlement Records

Figure 5:
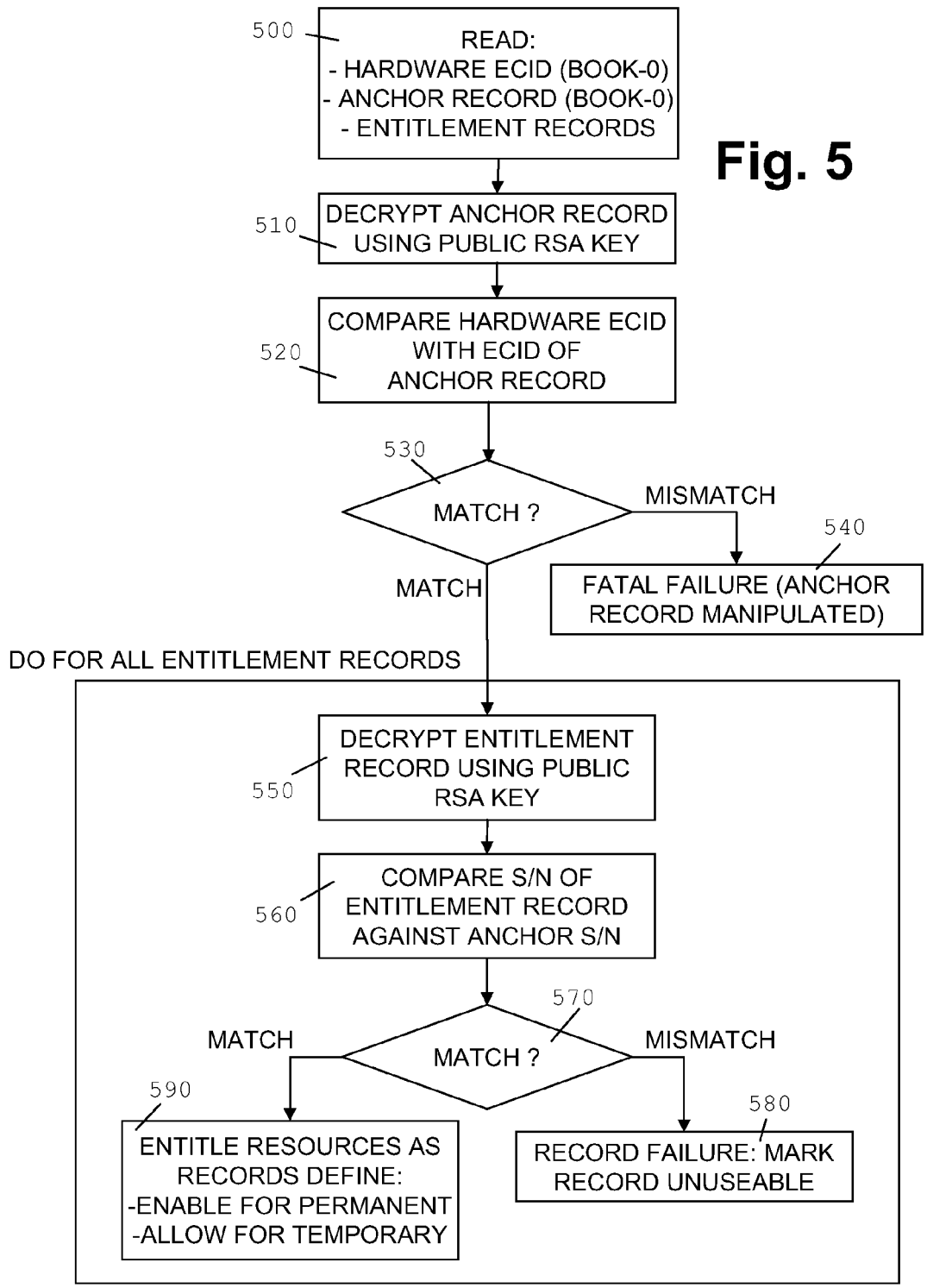
FIG. 5: Is a flow diagram illustrating a method in accordance with the invention.

Whenever the computer system initializes or when the customer or some automation tool decides to utilize temporary capacity the permanent and/or the temporary entitlement records need to be validated. It must be ensured that the entitlement records belong to the respective computer system. For validation the chain ECID-S/N-entitlement must be verified. The verification of the entitlements is illustrated in FIG. 5. In step 500 the computer system retrieves the hardware ECID directly from the hardware of processor book 150 and reads the anchor record from the non-volatile storage of processor book 150. Also the computer system reads all the entitlement records from the system non-volatile storage. In step 510 the computer system decrypts the anchor record and then verifies equivalence of the hardware ECID and the ECID stored in the anchor record in step 520. If a mismatch is found in step 530, this indicates manipulation and results in a fatal error in step 540. If a match is found in step 530 the correct system serial number is provided. Then the computer system continues with checking all entitlement records. In step 550 an entitlement record is decrypted using the public RSA key. Then in step 560 the entitlement record is checked by comparing the serial number (used as the system unique ID in the entitlement record) against the validated serial number of the anchor record. If a mismatch is found in step 570, then this indicates a manipulation of the entitlement record. Then the entitlement record is not accepted and marked 'unusable' in step 580. Only validated entitlement records will be accepted to enable system capacity in step 590.

Capacity entitled in permanent entitlement records is immediately enabled; capacity entitled in temporary entitlement records is made available to the customer for temporary upgrade whenever he decides to utilize this temporary capacity. The temporary upgrade and downgrade may be done manually or by automation to the extent as defined by the total of validated temporary entitlement records.

A simple embodiment of the invention only uses the non-volatile memory 155 of processor book 150 because the System Anchor record 210 only contains the value of ECID 110 as ECID 211. As long as processor book 150 stays in a configuration the other ECIDs 120, 130, 140 are not used. Whenever processor book 150 is replaced by a new processor book the ECID 110 is obsolete and needs to be replaced by the ECID of the new processor book as well as the System Anchor record 210 must be replaced by a new System Anchor record to reflect the new ECID.

Since the System Anchor record 210 refers to processor book 150 it is recommended to store the System Anchor record 210 in the non-volatile memory 155 of processor book 150 only. The entitlement records 220, 230, 240, 250 as system level configuration data, however, may not be stored in the non-volatile memories of the processor books but in some non-volatile system storage that is not exchanged as part of a processor book. An example is a hard disk storage of the computer system. This has the advantage that it is not required to transfer the entitlement records to the replacement hardware before the exchange. Another advantage is that is more difficult to clone the entitlement data and use it for a different computer system, for which it was not authorized by the manufacturer and/or seller of the computer system.

Instead of processor book 150 also one of the other processor books 160, 170, 180 could be used to store the system anchor record. But there is only one System Anchor record in use per computer system at the same time. For example, by defining an exchangeable component that is plugged in a dedicated slot of the computer system as the carrier of the System Anchor record, the management of the assignment of a System Anchor record to a particular computer system is simplified for the manufacturer and/or seller. With this convention, only the subset of the exchangeable components comprising System Anchor records needs to be tracked separately.

Instead of the ECID 110, also another unchangeable identifier stored in the computer system can be used. The advantage of using ECID 110 is that it is guaranteed that it is always available for the System Anchor record 210 in case the processor book 150 is not broken. Otherwise, if the unchangeable identifier is stored in a different component, the System Anchor record can be unusable when this component is broken. However, if an unchangeable identifier is used which is stored in a component which cannot be replaced, the problem solved by the present invention would not exist. In that case, all entitlement records will be associated to the computer system directly as the unchangeable identifier is then always available unless the entire computer system is (at least temporarily) broken.

In the preferred embodiments of the invention, the flexible temporary capacity upgrade/downgrade method and device for a computer system described in U.S. Pat. No. 7,194,616 are adapted accordingly. U.S. Pat. No. 7,194,616 introduces a so called Resource Controller that enables and disables processor capacity and other resources upon request. It enables the various resources up to a level as defined in Capacity Data Sets defining the maximum of permanent entitlements and the maximum of temporary entitlements. The entitlement records will be used as the Capacity Data Sets. The Capacity Data Sets are stored in a storage unit connected to a hardware console, which is part of the computer system.

This approach is not limited to protect resources of processor books. The entitlement records may include entitlements for I/O (input/output) adapters or other functions provided by the same computer system under the same system serial number, or separate entitlement records for such resources may be defined and linked to the System Anchor record.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
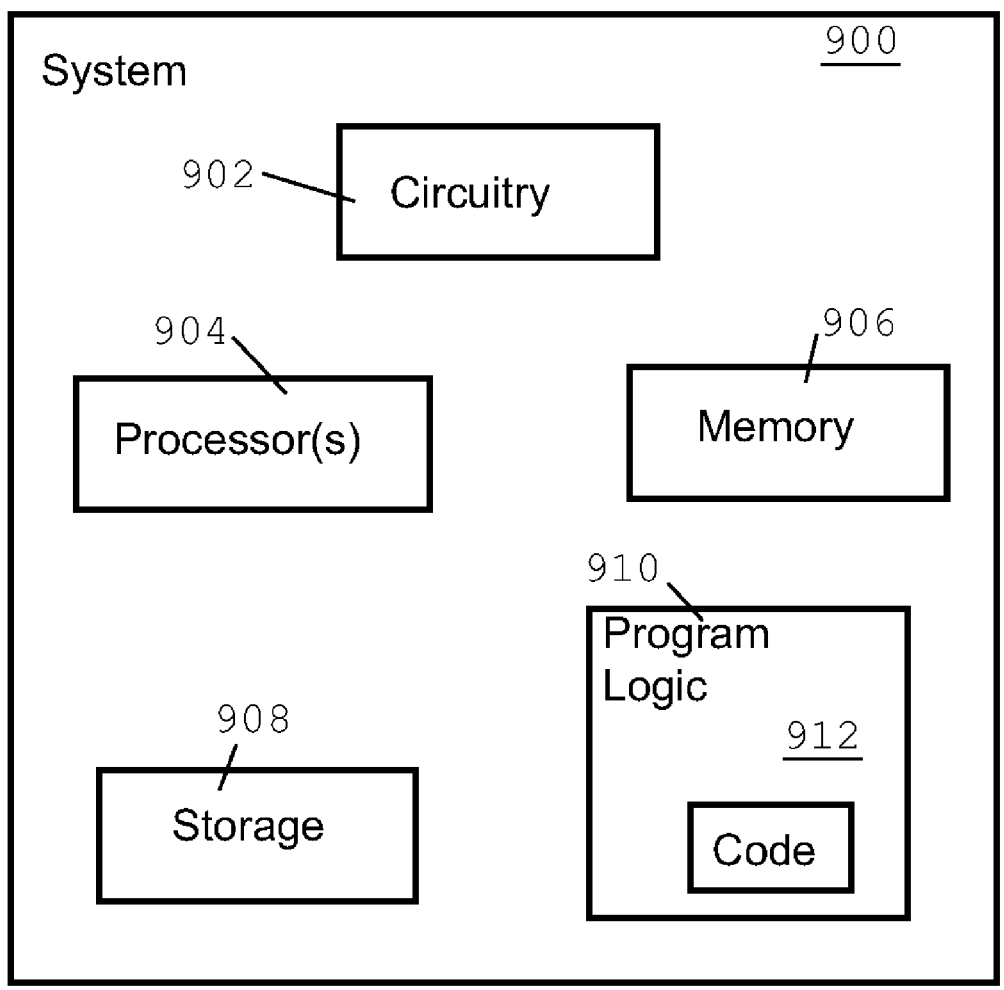
FIG. 6: Is a block diagram of a system in which certain embodiments may be implemented.

FIG. 6 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 7 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for configuring functional capabilities in a data processing system comprising an exchangeable component, said exchangeable component comprising a first unique identifier in a first non-volatile storage, said first unique identifier being unchangeable, said data processing system further comprising entitlement records, the method comprising the steps of:

reading a second unique identifier and a system unique identifier in encrypted form from one of the following: said first non-volatile storage, a second non-volatile storage;

decrypting said second unique identifier and said system unique identifier;

comparing said first unique identifier and said second unique identifier, and, in case of a match, for every entitlement record:

extracting an entitlement record identifier and record entitlement data from the entitlement record, comparing said entitlement record identifier with said system unique identifier, and, in case of a match, entitling resources of said exchangeable component with said record entitlement data extracted from the entitlement record;

configuring functional capabilities based on the resource entitlements;

receiving a customer order for additional functional capabilities for said data processing system;

converting said customer order into production and shipment instructions and storing said instructions in a second database comprising manufacturing data for said data processing system;

reading from said second database: said system serial number associated to said data processing system and entitlement data for functional capabilities of said data processing system;

generating an entitlement record from said system serial number and said entitlement data; and in case said data processing system is manufactured, storing the generated entitlement record in said data processing system, otherwise sending the generated entitlement record to said data processing system and, responsive to receiving the generated entitlement record, said data processing system processing the generated entitlement record and storing new entitlements.

2. The method of claim 1, wherein said exchangeable component comprises said second non-volatile storage, and wherein said second non-volatile storage is used in the reading step.

3. The method of claim 1, with the additional steps of:

reading said first unique identifier from said exchangeable component;

reading a system serial number associated to said data processing system from a first database comprising manufacturing data for said data processing system;

storing said first unique identifier as said second unique identifier in said second non-volatile storage; and storing said system serial number as said system unique identifier in said second non-volatile storage.

4. The method of claim 3, wherein said first and said second database are the same database.

5. The method of claim 1, wherein a said instruction comprises instructions to ship hardware components for said data processing system and instructions to enable functional capabilities of said data processing system.

6. The method of claim 1, where the entitlement record identifier and the record entitlement data for every entitlement record is encrypted.

7. The method of claim 1, where the entitlement record identifier is a system serial number associated to said data processing system.

8. The method of claim 1, where the record entitlement data specifies certain resources of the data processing system.

9. The method of claim 1, wherein the second unique identifier and the system unique identifier are maintained in a system anchor record, and wherein each entitlement record of the every entitlement record is linked to the system anchor record via the system unique identifier.

10. The method of claim 9, wherein the system unique identifier is a system serial number associated with said data processing system.

11. The method of claim 9, wherein the second unique identifier and the system unique identifier are encrypted in the system anchor record.

12. The method of claim 9, wherein the system anchor record is linked to the exchangeable component via the first unique identifier.

13. The method of claim 9, wherein the first unique identifier uniquely identifies the exchangeable component with respect to other components of the data processing system.

14. The method of claim 1, wherein the first non-volatile storage is part of an integrated circuit device of the exchangeable component.

15. The method of claim 14, wherein the second non-volatile storage is a flash memory device of the exchangeable component.

16. A computer program product comprising a tangible computer usable storage device storing program instructions executable by a computer, the stored program instructions comprising software code portions for performing, when said program instructions are run on the computer, steps of:

reading a second unique identifier and a system unique identifier in encrypted form from one of the following: said first non-volatile storage, a second non-volatile storage;

decrypting said second unique identifier and said system unique identifier;

comparing said first unique identifier and said second unique identifier, and, in case of a match, for every entitlement record:

extracting an entitlement record identifier and record entitlement data from the entitlement record, comparing said entitlement record identifier with said system unique identifier, and, in case of a match, entitling resources of said exchangeable component with said record entitlement data extracted from the entitlement record;

configuring functional capabilities based on the resource entitlements;

receiving a customer order for additional functional capabilities for said data processing system;

converting said customer order into production and shipment instructions and storing said instructions in a second database comprising manufacturing data for said data processing system;

reading from said second database: said system serial number associated to said data processing system and entitlement data for functional capabilities of said data processing system;

generating an entitlement record from said system serial number and said entitlement data; and in case said data processing system is manufactured, storing the generated entitlement record in said data processing system, otherwise sending the generated entitlement record to said data processing system and, responsive to receiving the generated entitlement record, said data processing system processing the generated entitlement record and storing new entitlements.

17. A device for configuring functional capabilities in a data processing system, said data processing system comprising an exchangeable component, said exchangeable component comprising a first unique identifier in a first non-volatile storage, said first unique identifier being unchangeable, said data processing system further comprising entitlement records, said device comprising:

reading means to read a second unique identifier and a system unique identifier in encrypted form from one of the following: said first non-volatile storage, a second non-volatile storage;

decrypting means to decrypt said second unique identifier and said system unique identifier, wherein said decrypting means are responsive to said reading means;

first comparing means to compare said first unique identifier and said second unique identifier;

extracting means to extract from every entitlement record an entitlement record identifier and record entitlement data, wherein said extracting means are responsive to said first comparing means;

second comparing means to compare said entitlement record identifier with said system unique identifier;

entitling means to entitle resources of said exchangeable component with said record entitlement data extracted from said entitlement record, wherein said entitling means are responsive to said second comparing means;

configuring means to configure functional capabilities based on the resource entitlements;

receiving means to receive a customer order for additional functional capabilities for said data processing system;

converting means to convert said customer order into production and shipment instructions and store said instructions in a second database comprising manufacturing data for said data processing system;

reading means to read from said second database: said system serial number associated to said data processing system and entitlement data for functional capabilities of said data processing system;

generating means to generate an entitlement record from said system serial number and said entitlement data; and in case said data processing system is manufactured, means to store the generated entitlement record in said data processing system, otherwise send the generated entitlement record to said data processing system and, responsive to receiving the generated entitlement record, said data processing system processing the generated entitlement record and storing new entitlements.

18. The device of claim 17, further comprising:

means to read said first unique identifier from said exchangeable component;

means to read a system serial number associated to said data processing system from a first database comprising manufacturing data for said data processing system;

means to store said first unique identifier as said second unique identifier in said second non-volatile storage; and means to store said system serial number as said system unique identifier in said second non-volatile storage.

\* \* \* \* \*